United States Patent [19]

Tanaka et al.

[11] Patent Number: 5,437,034
[45] Date of Patent: Jul. 25, 1995

[54] METHOD OF GENERATING FROM SOURCE PROGRAM OBJECT PROGRAM BY WHICH FINAL VALUES OF VARIABLES FOR PARALLEL EXECUTION ARE GUARANTEED

[75] Inventors: Yoshikazu Tanaka, Omiya; Kyoko Iwasawa, Tokyo, both of Japan

[73] Assignee: Hitachi, Ltd., Tokyo, Japan

[21] Appl. No.: 870,049

[22] Filed: Apr. 15, 1992

[30] Foreign Application Priority Data

Apr. 19, 1991 [JP] Japan .................. 3-088106

[51] Int. Cl.[6] .............................. G06F 9/45
[52] U.S. Cl. .......................... 395/700; 364/DIG. 1; 364/280.4; 364/973; 395/375; 395/650
[58] Field of Search ................. 395/700; 364/DIG. 1, 364/DIG. 2

[56] References Cited

U.S. PATENT DOCUMENTS

| 4,833,606 | 5/1989 | Iwasawa et al. | 395/700 |
|---|---|---|---|
| 5,088,034 | 2/1992 | Ihara et al. | 395/700 |
| 5,255,385 | 10/1993 | Kikuchi | 395/575 |

OTHER PUBLICATIONS

Padua, David A., et al. "Advanced Compiler Optimizations for Supercomputers," Communications of the ACM, vol. 29, No. 12, Dec. 1986, pp. 1184–1201. (provided in English).
Aho, Alfred V., et al. *Principles of Compiler Design*, Addison–Wesley Publishing Company, 1979, pp. 489–490. (provided in English).
Yasumura, Michiaki, et al. "Compiling Algorithms and Techniques for the S-810 Vector Processor," International Conference on Parallel Processing, IEEE, 1984, pp. 285–290. (provided in English).

*Primary Examiner*—Kevin A. Kriess
*Assistant Examiner*—Lucien Toplu
*Attorney, Agent, or Firm*—Fay, Sharpe, Beall, Fagan, Minnich & McKee

[57] ABSTRACT

In a method of generating an object program for a multiprocessor system from a source program including a loop, there is detected a variable in the loop. For the detected variable, first codes providing a one-dimensional work array are added to the source program. The work array has elements whose the number is predetermined according to a maximum number of parallel processes to be generated for the loop and is shared among the parallel processes. It is determined whether or not the variable is used outside the loop. When it is determined that the variable is not used at any position outside the loop, the source program with the first codes added is compiled to produce the object program, thereby executing the loop in a parallel fashion by the parallel processes using the elements of the work array as a local variable associated with the variable.

9 Claims, 6 Drawing Sheets

| LOOP TO BE PARALLELIZED ⎯90 | VARIABLE/ARRAY NECESSARY FOR DIFFERENT AREA FOR PARALLEL PROCESSES ⎯91 | VARIABLE/ARRAY NECESSITATING GUARANTEE OF FINAL VALUE(S) ⎯92 | VARIABLE/ARRAY DEFINED IN ALL PATHS ⎯93 |
|---|---|---|---|
| DO 10 | I | NO | |
| | T | YES | YES |
| DO 20 | I | NO | |
| | T | YES | NO |

METHOD OF GENERATING FROM SOURCE PROGRAM OBJECT PROGRAM BY WHICH FINAL VALUES OF VARIABLES FOR PARALLEL EXECUTION ARE GUARANTEED

BACKGROUND OF THE INVENTION

1. Field of the Invention

The present invention relates to a compiling method, and in particular, to a compiling method of generating from a source program an object program for a multiprocessor system by which object program final values of variables for parallel execution are guaranteed without wasting a memory area.

2. Description of Related Art

Description will be given of the related art by reference to prior program examples as follows.

PRIOR EXAMPLE 1

```
    DO 100 I = 1, N            (L20)
        X = A(I) + B(I)        (L21)
100 C(I) = X**2                (L22)
```

PRIOR EXAMPLE 2

```
    allocate (XTEMP(1:N))      (L23)
    DO 100 I = 1, N            (L24)
        XTEM (I) = A(I) + B(I) (L25)
100 C(I) = XTEMP (I)**2        (L26)
    X = XTEMP (N)              (L27)
    free (XTEMP)               (L28)
```

PRIOR EXAMPLE 3

```
    DO 100 I = 1, N            (L29)
    real X                     (L30)
        X = A(I) + B(I)        (L31)
100 C(I) = X**2                (L32)
```

As shown in the prior example 1, in order to execute, by a vector computer system or a parallel computer system, a program including a variable (to be called a scalar variable) defined in a loop, data thereof being written in an identical area over all iterations, e.g., a variable X in a statement (line 21) of a loop (lines 20 to 22 to be conveniently represented as L20–L22 herebelow; this applies also to other lines), it is necessary to allocate the variable X to a temporary array in the loop, as described in pages 1184 to 1201 of an article "Advanced Compiler Optimizations for Supercomputers", Communications of the ACM, Vol. 29, No. 12, December 1986. Also, when a value of a variable or an array, like the value of the variable x, which appears in a defining statement in a loop, at an exit of the loop, i.e., a final value used outside the loop, it is necessary to guarantee the final value.

Of conventional methods for this purpose, a first method is shown in the prior example 2 of a program, in which the value of a variable X is used in the program after execution of a loop is completed. In this case, a temporary array XTEMP is assigned to the variable (L23) and accessed (L26) in a loop (L24–L26). A final value of the array XTEMP is assigned to the variable X (L27) after the completion of loop execution and then the temporary array XTEMP (L28) is released. Such codes (L23–L28) are generated by a compiler. A second method can be applied to a case of a program wherein the value of a variable X is not used after completion of the execution of a loop. Only under this condition, in a program for a parallel computer system, a method shown in the prior example 3 may be employed. That is, a code (L30) for preparing a separate area for a variable X for every iteration of a loop (L29–L32) is generated.

However, in the conventional technology, when a program is executed in parallel by a parallel computer system, there arise the following problems. In the above first method, it is required to prepare in a main storage an area for a scalar variable having a size identical to a loop length of a DO loop to be parallelized, i.e., the number of iterations of a loop. This consequently leads to a problem that when the number of iterations of a loop or an iteration count takes a large value, the area occupies a large portion of a memory area of the main storage. In addition, when an actual loop length is determined only at execution of the loop, the area is required to be dynamically allocated in the main storage. Consequently, when the number of iterations of a loop takes a large value, there may take place an overhead time which cannot be ignored with respect to the system performance. In the second method, when a plurality of small numbers of iterations of a loop are assigned to a scalar variable for the respective parallel processing units (to be called processes herebelow), the problem in the first method can be avoided. However, there has not been known a method of guaranteeing a final value in a case where the scalar variable is used outside the loop.

Further, according to the conventional parallelization technology, there has not been clarified a method of achieving a parallelization processing in a case where a scalar variable is not necessarily defined in all paths of a loop and the final value is required to be guaranteed. In this connection, that a scalar variable is defined in all paths means that a variable is necessarily defined in each iteration of a loop (L48, L49), as in a variable X of a following prior example 5. In contrast thereto, that a scalar variable is not necessarily defined in all paths means that the variable is not necessarily defined in each iteration of a loop (L42), as in the variable X of a following prior example 4. Namely, in a loop iteration in which a condition of the conditional statement L41 is not satisfied, the variable X is not defined.

PRIOR EXAMPLE 4

```
    DO 10 I = 1, N             (L40)
        IF (Z(I) · GT · O) THEN (L41)
            X = C(I) + D(I)    (L42)
            A(I) = X**2        (L43)
        END IF
10  CONTINUE                   (L44)
    Y(1) = X                   (L45)
```

PRIOR EXAMPLE 5

```
    DO 100 I = 1, N            (L46)
        IF (Z(I) · GT · O) THEN (L47)
            X = C(I)           (L48)
        ELSE
            X = D(I)           (L49)
        END IF
        A(I) = X**2            (L50)
100 CONTINUE                   (L51)
    Y(1) = X                   (L52)
```

SUMMARY OF THE INVENTION

It is therefore an object of the present invention to provide a compiling method in which a final value of a scaler variable/array can be guaranteed without an abrupt increase of a main storage, thereby solving the above problems.

In order to achieve the object above, in a compiling method for a parallel computer system including a plurality of processors according to the present invention, when a source program is given, a parallelization processing is executed to recognize portions of the source program to be executed in parallel and to convert the portions into intermediate codes indicating a parallel execution. As a result, a DO loop is subdivided into a plurality of parallel processes so as to generate an object program executing the parallel processes. In the parallelization processing, existence of a simple variable/array defined in the DO loop having a subscript which is invariable in the loop are detected. For the variable/array, a work variable/array is assigned for each process. When the variable/array is used outside the loop, whether the variable/array is necessarily defined in all paths of the loop is detected. If this is achieved, there is generated an object program in which a value of the work variable/array is assigned for each process to the variable/array in a process conducting a last loop processing. For the variable/array not necessarily defined in all paths, the maximum number of processes to be generated is predetermined by the compiler, thereby keeping the value of the variable/array at an exit of a loop in each parallel process execution portion and a loop index value attained at this point of time. There is determined a process which generates a value at the loop exit of the overall loop after all parallel processes are executed such that the value thereof at the loop exit of the process is assigned to the variable/array.

Next, description will be given of a case where the variable/array is not necessarily defined in all paths of a loop in a program. Conventionally, there has been no method of parallelizing the loop. In contrast thereto, according to the present invention, the loop can be parallelized.

In addition, according to the compiling method of the present invention, in a case where for a simple variable/array having an invariable subscript defined in a DO loop, when a value thereof is needed outside of the DO loop, the value is guaranteed.

Conventionally, when a variable/array is necessarily defined in all paths of a loop, the loop can be parallelized only in a method in which the variable/array undergoes an operation to form an array (the degree of dimension is increased by one and it is called scalar expansion). However, in this method, for a variable/array, an area having a size identical to the loop length has to be reserved in a main storage. Consequently, when the loop length takes a great value, there is required a considerably large main storage and hence it is substantially impossible to parallelize the loop in many cases. In contrast thereto, according to the method of the present invention, only a decreased amount of main storage is required for each process. In general, a process handles a plurality of loop operations (the total number of processes is at most several times the number of CPUs employed in the system). Consequently, a small amount of main storage space is necessitated by the processes.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
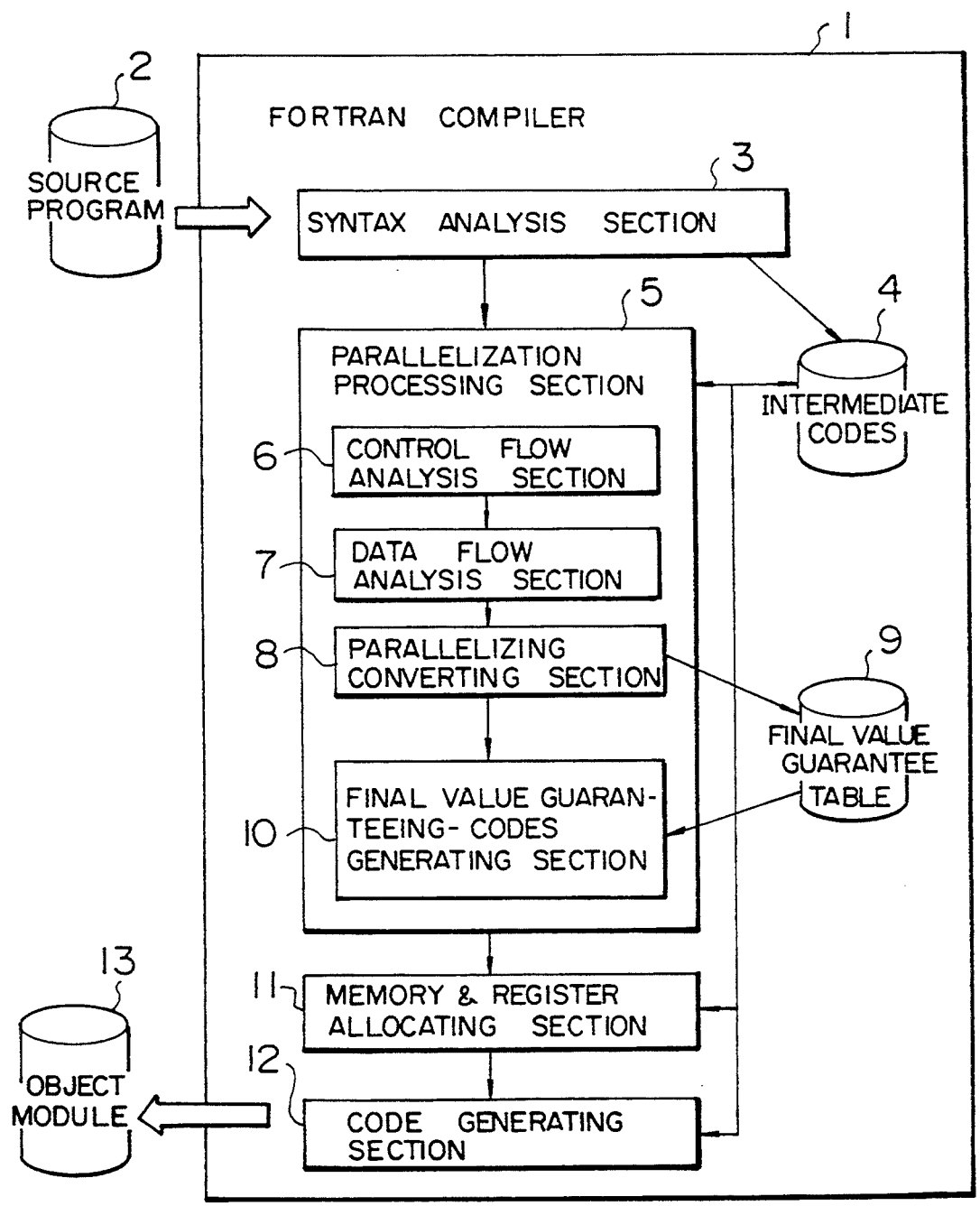
FIG. 1 is a diagram schematically showing the overall configuration of a compiler according to an embodiment of the present invention.

Referring now to the drawings, description will be given of a compiling method for program parallelization according to the present invention.

FIG. 1 shows the overall structure of a compiler to which the present invention is applied. When a source program is inputted, a syntax analysis section 3 analyzes characters and syntax of the source program 2 to generate intermediate codes 4. A parallelization processing section 5 receives the intermediate codes 4, determines whether or not the intermediate codes 4 can be parallelized and converts the codes 4 so that an optimal parallel object module can be generated. Resultantly, the parallelization is enhanced on variables/arrays necessitating guarantee of final values to improve an execution efficiency of the object module and also a large increase in the main storage capacity thus required is suppressed. A memory and register allocating section 11 allocates memory areas and registers and a code generating section 12 generates an object module.

In the processing for generating a parallelized object module according to the compiling method of the present invention, a scalar variable requiring the final value guarantee is classified depending on whether or not the scalar variable is necessarily defined in all paths, and thereby directed to processing as follows based on the result of classification. Moreover, this also can apply to arrays.

For a scalar variable necessarily defined in all paths, a process registering library ¥ DISP initiated divides processing of a DO loop into a plurality of parallel processing units (parallel processes) and then assigns process numbers to the respective parallel processes. A process initiating library ¥ PRCS acquires the process numbers of the parallel processes and a process number of a last parallel process and passes the acquired items to the object module, thereby initiating the parallel processes. The compiler generates, in the object module for each parallellized loop in correspondence with the above processing, codes for setting parallel execution information such as a DO loop length and codes for initiating the library DISP. Moreover, there are generated codes for comparing a process number of a parallel process to be executed with that of the last parallel process including a last iteration of the loop, and codes for assigning to an original variable/ array a value(s) of a temporary variable/array corresponding to the original variable/array in the last parallel process upon execution of the last parallel process, when it is judged that the process number of the parallel process is identical to that of the last parallel process.

For a scalar variable not necessarily defined in all the paths, the compiler determines a maximum number of processes (such as a number of CPUs) for the parallelized loop and prepares two kinds of arrays each having elements of the number equal to the maximum number of processes. Of these arrays, a first array is used to store therein values of a standardized control variable of a DO loop when definition of the scalar variable is made in each parallel process. This array is called a share index array. The standardized control variable values are obtained by conducting a linear transformation of the original loop control variable values into resultant values as $0, 1, \ldots, M-1$ (M is the original number of iterations of a loop) with the initial value set to zero and increment value set to one. A second array stores therein final values of a variable associated with the scalar variable after execution of respective parallel processes. This array is called a share work array. The library ¥ DISP divides the processing of a DO loop into at most the maximum number of parallel processing units, i.e., parallel processes according to such parallel process execution information set in the object module as the number of iterations of the loop and the maximum number of processes and registers the parallel processes. The library ¥ PRCS transfers process numbers of the respective parallel processes to the object module to cause the parallel processing to be executed.

For this purpose, the compiler generates, in each parallel process, codes for setting a standardized loop control variable value in an element of the share index array associated with the process number at a position for the scalar variable to be defined; codes for setting, after the processing of the loop is completed in the parallel process, the value of a work variable corresponding to the scalar variable in an element of a share work array associated with the process number of the parallel process; codes for searching, in a sequential execution process of the object module after all the parallel processes are completed, the elements of the share index array for a first element not having an initial value in a direction reverse to increment of the process number and determining from the element number of the first element a process number of a parallel process in which the latest definition of the scalar variable is made; and codes for setting a value of the element of the share work array associated with the determined process number to the original scalar variable.

In this connection, for a scalar variable necessarily defined in all the paths, the method applied to the scalar variable not necessarily defined in all the paths may also be used.

Subsequently, description will be given in detail of the compiling method according to the present invention.

Description will be first given of the parallelization processing by reference to the source programs of the following examples 1 and 2 wherein a scalar variable is necessarily defined in all paths and is not necessarily defined in all paths, respectively.

EXAMPLE 1

| | |
|---|---|
| DO 10 $I = N1, N2, N3$ | (L110) |
| $T = A(I) + B(I)$ | (L111) |
| $C(I) = T + D(I)$ | (L112) |
| 10 CONTINUE | (L113) |
| $X(1) = T$ | (L114) |

EXAMPLE 2

| | |
|---|---|
| DO 20 $I = N1, N2, N3$ | (L130) |
| IF $(A(I) \cdot GT \cdot O)$ THEN | (L131) |
| $T = B(I) + C(I)$ | (L132) |
| $A(I) = T$ | (L133) |
| END IF | |
| 20 CONTINUE | (L134) |
| $X(1) = T$ | (L135) |

First, based on information from a control flow analysis section 6 and a data flow analysis section 7, a parallelizing converting section 8 determines whether or not a source program can be parallelized and achieves a conversion for parallelization of intermediate codes. In the parallelizing conversion, each of the variables/ arrays requiring a separate area for each of parallel processes corresponding to a loop to be parallelized is classified as shown in FIG. 2 to generate a final value guarantee table 9.

Figures 2, 3:
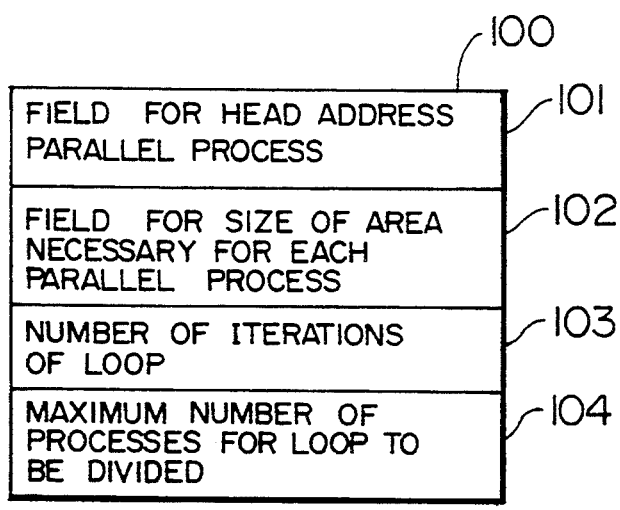
FIG. 2 is a diagram for explaining a final-value-guaranteeing table.
FIG. 3 is a conceptual diagram showing a parallel execution information table.

Description will be next given of the table 9 of FIG. 2. In a field 91 of a variable/array requiring a separate area for each parallel process, there is written a name of the variable/array which cannot be generally parallelized because accesses to the variable/array conflict with each other between parallel processes if separate areas are not reserved for the respective parallel processes. In a DO loop beginning from a code L110 of the example 1, there exist variables I and T. In a DO loop L130-L134 of the example 2, there exist variables I and T. In a field 92 of a variable requiring the final value guarantee, there is written an identifier indicating whether or not the variable/array is used outside the loop. In the examples 1 and 2, the variable T is used in the statements L114 and L135 outside the loop and hence is regarded as a variable necessitating the final value guarantee.

Judgement of whether or not the final value guarantee is necessary is accomplished by use of a live variable analysis employed in the known compiler technology. The analysis has been described in pages 489 and 490 of the "Principles of Compiler Design" written by Alfred V. Aho and Jeffrey D. Ullman and published from Addison-Wesley Publishing Company in 1979. That is, it is only necessary to determine whether .or not the variable exists in a set OUT of live variables at an exit of a loop, as described in the article and the live variable is defined as a variable to be used in the program after the loop exit.

Figure 7:
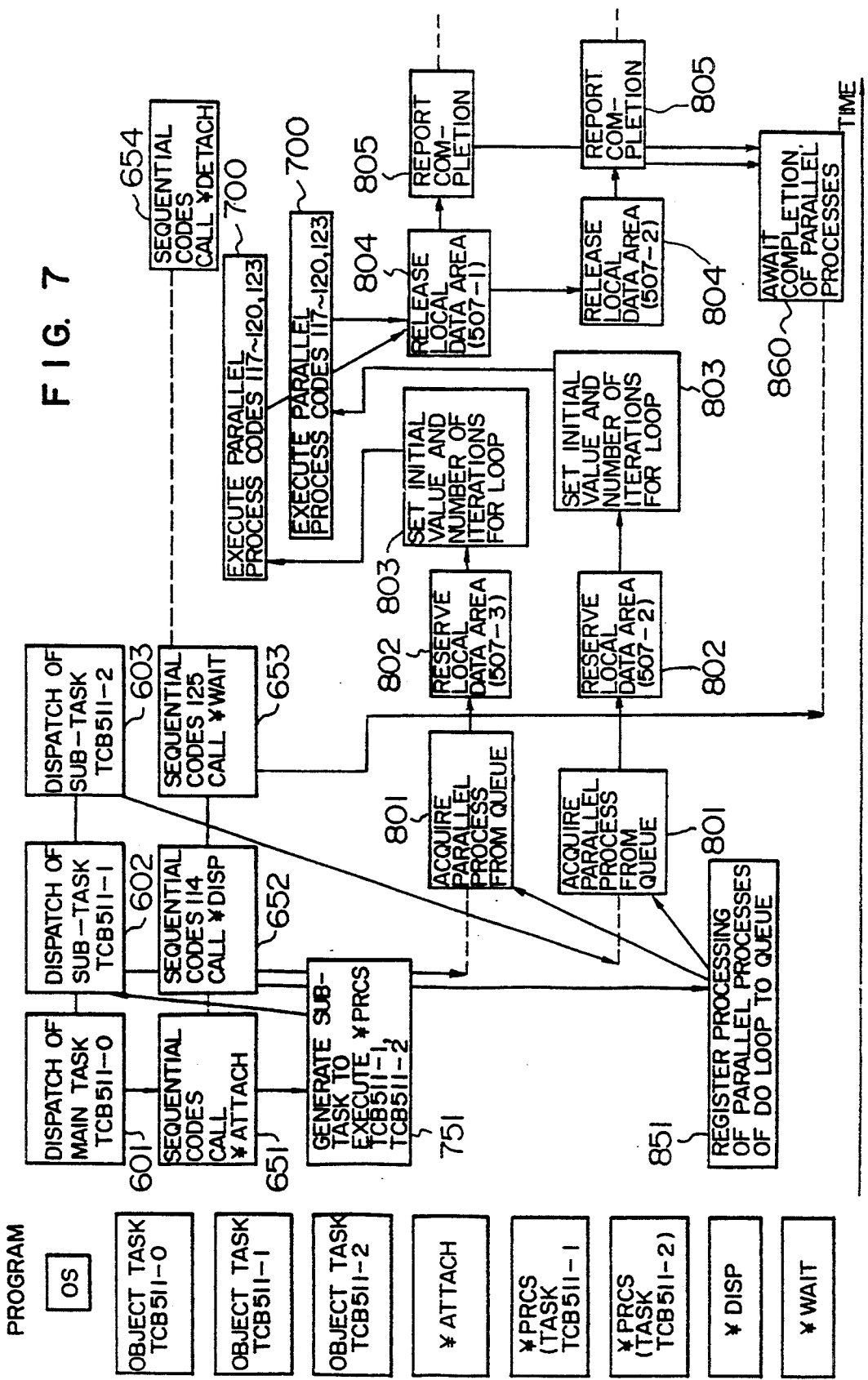
FIG. 7 is a sequence diagram for explaining processing to be executed in the environment of FIG. 4.

Referring now to the following examples 3 and 4 and FIGS. 4 and 7, description will be given of a known method of achieving a parallel program execution in a case where the variable does not require the final value guarantee. In this connection, the same codes or statements are assigned with the same reference numerals. Moreover, in the example 4, codes L117 to (L123) form parallel process codes.

EXAMPLE 3

```
        DO 10 I = N1, N2, N3          (L110)
        T = A(I) + B(I)                (L111)
        C(I) = T + D(I)                (L112)
     10 CONTINUE
```

EXAMPLE 4

```
            CALL ¥DISP (TLB1)          (L114)
            GOTO LAB1                  (L115)
     LAB2:
            DO 10 ¥L = ¥INI, ¥INI + ¥LEN − 1   (L117)
            ¥I = N3*¥L + N1                    (L118)
            ¥T = A(¥I) + B(¥I)                 (L119)
            C(¥I) = ¥T + D(¥I)                 (L120)
         10 CONTINUE
            Codes to return to caller ( PRCS)  (L123)
     LAB1:                                     (L124)
            CAJ ¥WAIT                          (L125)
```

In the program of the example 3, when the variable T is not used outside the loop, the final value guarantee is unnecessitated and hence a parallel program execution is carried out as follows. Namely, the program is developed by a parallelizing compiler into an object module as shown in the example 4 (written in the form similar to that of FORTRAN for simplicity). The object module is executed in an environment as shown in FIG. 4. The object module of the example 4 corresponds to the module 520 of FIG. 4. However, codes L114, L115, L124, and L125 are sequentially executed object codes 521, whereas codes L116 to L120 and L123 are parallel process execution object codes 522. In an area 100 for the parallel process execution information, there is stored TBL1 written in a statement L114. In a data area 523, variables and arrays are stored.

Figure 4:
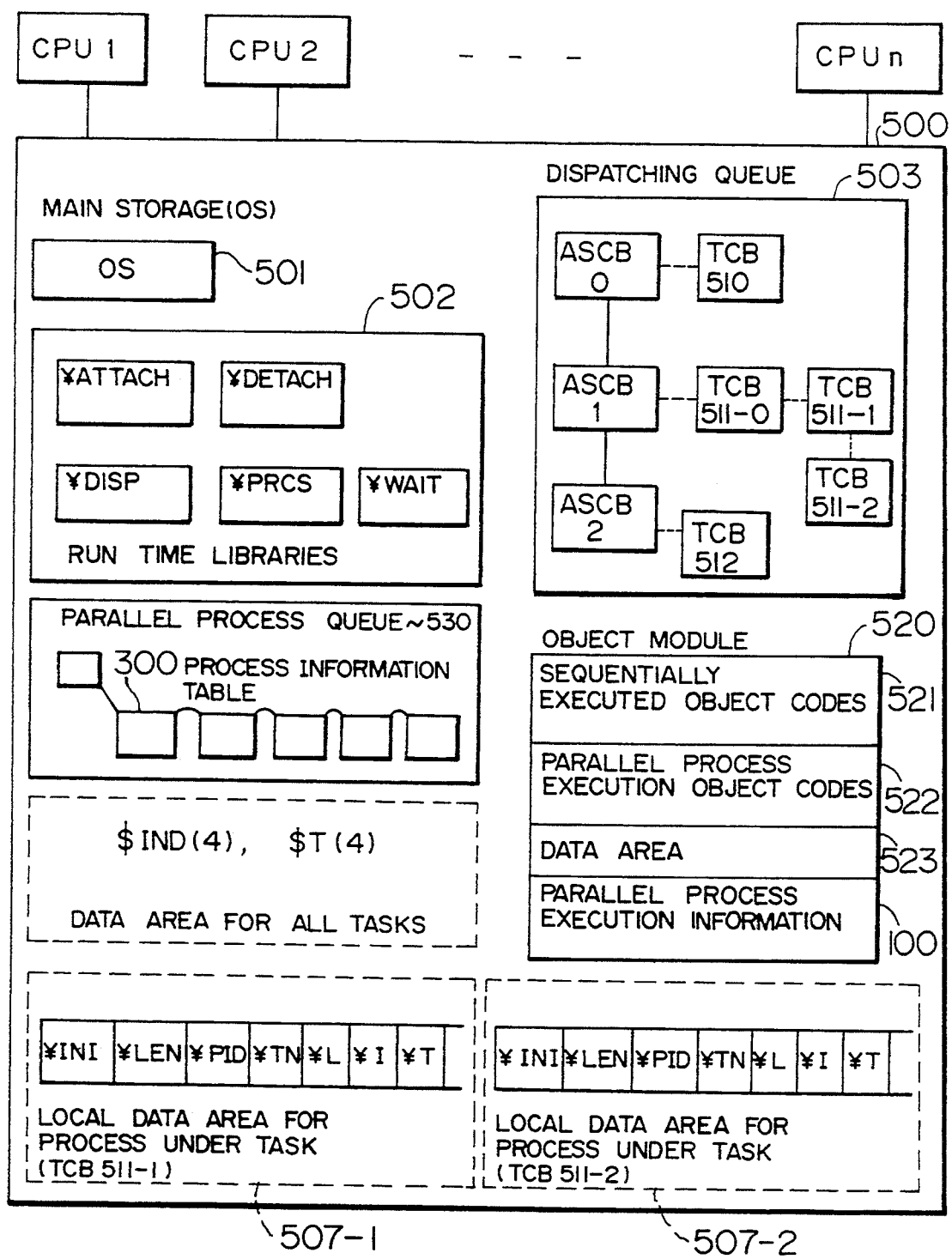
FIG. 4 is a diagram for explaining an environment for executing parallel processes.

The system of FIG. 4 includes processors CPU1 to CPUn and a main storage (MS) 500 shared thereamong. In this system, in response to a job request from a user, an operating system (OS) 501 generates a user space ASCB 1 and a main task TCB 511-0 to be executed in this user space ASCB 1. In a block 601 of FIG. 7, the operating system 501 selects from a dispatching queue 503 the main task TCB 511-0 for executing a user program or object module 520 so that the user object module is executed by appropriate CPUs. The object module 520 for the parallel execution includes codes for calling a run time library ¥ATTACH 502 for generating at a starting position of the program execution a plurality of children tasks, i.e., two children tasks TCB 511-1 and TCB 511-2 in this example, and the library ¥ATTACH is called in a block 651.

In this connection, details about operations of the five libraries ¥ATTACH, ¥DETACH, ¥DISP, ¥PRCS, and ¥WAIT as the run time execution libraries have been described in the U.S. patent application Ser. No. 07/658,776 filed by Tanaka et al. on Feb. 20, 1991, which is incorporated herein by reference.

In a block 654, the object module 520 includes codes for calling the library ¥DETACH 502 for detaching the children tasks at an end of program execution. In a block 751, the library ¥ATTACH determines the number of children tasks to be generated according to the system state, e.g., the number of CPUs or a designation written in the job control language (JCL) by the user and generates the children tasks. In blocks 602 and 603, the generated children tasks are also dispatched via the operating system 501. These plural children tasks execute the library ¥PRCS. The library ¥PRCS first reserves local data areas 507-1 and 507-2 for the tasks, respectively. Thereafter, according to process information tables 300 registered in a parallel process queue 530 by the library ¥DISP, associated parallel processes are executed. Namely, a plurality of processes are executed under execution of the library ¥PRCS. The operation of the library ¥PRCS will be described later after explanation of the operation of library ¥DISP.

A code L114 of the example 4 included in the object module for calling the library ¥DISP is executed when the sequential execution portion of the object module 520 of the main task has been executed immediately before a parallel execution portion. In a block 652, the library ¥DISP registers process codes L116 to L120 and L123 of the DO loop as the parallel processes in the parallel process queue 530. An argument TBL1 represents parallel process execution information 100 passed from the object module to the parallel run time library. The contents of TBL1 are shown in FIG. 3. A first field 101 contains information denoting a head address of a parallel process to be executed. In the example 4, this field contains an address of the parallel process section LAB2. A second field 102 contains information indicating the size of an area for each of variables/arrays to be reserved for each process for an execution of the parallel process section. In the object module of the example 4, variables with a symbol ¥ are those necessitating a separate area for each process. A third field 103 designates the number of iterations of the DO loop. A fourth field 104 is set with data when a restriction is imposed on the number of subdivisions of the parallel process section, i.e., the maximum number of parallel process for the parallel processing. This field 104 is introduced in accordance with the present invention.

Figure 5:
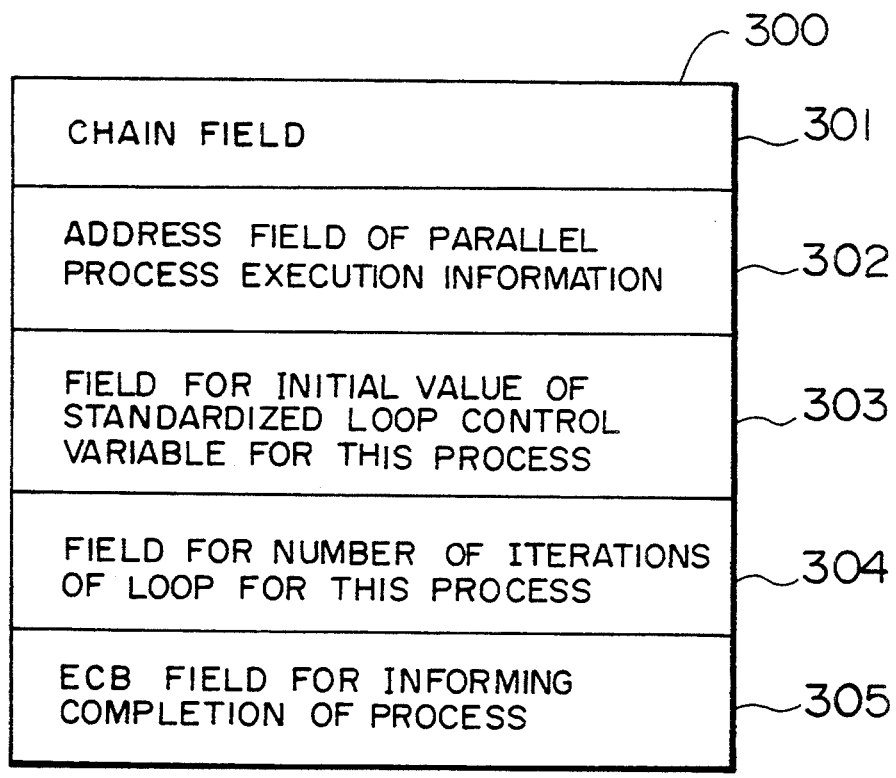
FIG. 5 is a diagram for explaining a process information table.

In a block 851, the library ¥DISP generates process information tables shown in FIG. 5 based on the parallel process execution information in the field 100 and then registers the tables to the parallel process queue 530.

The process information table is generated as follows. Based on the number of iterations of the DO loop in the field 103, the parallel process section is subdivided into a plurality of processes. Namely, the original DO loop is optimally subdivided into partitions of which the number is at most the maximum number of processes stored in the field 104. The initial value of a standardized loop control variable and the number of iterations of the loop for each parallel process are set in the fields 303 and 304, respectively. The standardized loop control variable is obtained by transforming values of the original loop control variable to be 0, 1, ..., M−1 (M is the original number of iterations of the loop) with the initial value "0" and the increment value "1". For example, when values of the original loop control variable are 3, 1, −1, −3, ..., and −11, values of the standardized loop control variable are obtained as 0, 1, 2, 3, ..., and 7. When the loop is to be subdivided into three parallel processes, three process tables corresponding to the three parallel processes are registered in the parallel process queue 530. The tables respectively have fields 303 and 304 containing values (0, 3), (3, 3), and (6, 2). The other fields of the process information table 300 have the following meanings. The content of a field 301 is used to establish a linkage between process information tables. A field 302 is used to store therein an address of the parallel process execution information. The address is passed as an argument to the library ¥DISP. A field 305 is used by the library ¥PRCS after completion of execution of an associated parallel process. Namely, the library ¥ PRCS issues a POST macro instruction thereto so as to inform completion of the execution.

In a block 801, the library ¥ PRCS acquires a process information table 300 from the parallel process queue 530 such that the associated parallel process is executed as follows. In a block 802, based on the process information table 300 and the parallel process execution information 100 specified in the table 300, an area necessary for the associated parallel process is reserved in a local data area as an area 507-1 or 507-2. In the reserved area, the initial value and the number of iterations of the loop of the standardized loop control variable in the fields 303 and 304 are set as the variables ¥ INI and ¥ LEN, respectively. The head address of the user program section to be executed in parallel is attained from the information 100 so that the control is branched to the address LAB2.

In a block 700, the parallel process codes L116 to L120 and L123 are executed. The variables ¥ INI and ¥ LEN of the parallel process codes L117 designate the initial variable and the number of iterations of the loop of the standardized loop control variable and are beforehand set by the library ¥ PRCS as above. The codes L118 is used for converting values of the standardized loop control variable into values of the original loop control variable. The codes L123 is disposed to return control to a caller, i.e., the library ¥ PRCS. The library ¥ PRCS first releases, in a block 804, the area 507-1 or 507-2 used by the parallel process and then issues, in a block 805, a POST macro to the field 305 of the process information table 300 so as to notify the termination of the parallel process.

On the other hand, the main task executes, after completion of the execution of the library ¥ DISP, the code L115 to transit its state to a state indicated by the label LAB1, and calls, at the code L125 in a block 653, a library ¥ WAIT to await completion of the plural parallel processes for the DO loop.

Through the operations above, the parallel process execution can be appropriately achieved without any problems for the DO loop in a case of absence of a variable/array requiring the final value guarantee. In a case of presence of a variable/array requiring the final value guarantee for each process, a variable value in the parallel process in which the latest definition of the variable is made is required to be restored as a value of the original variable. However, a local variable or intraprocess variable can be used only within a parallel process because the library ¥ PRCS reverses an area for the local variable for each process before the execution of the parallel process and the reversed area is released after completion of the parallel process.

Figure 6:
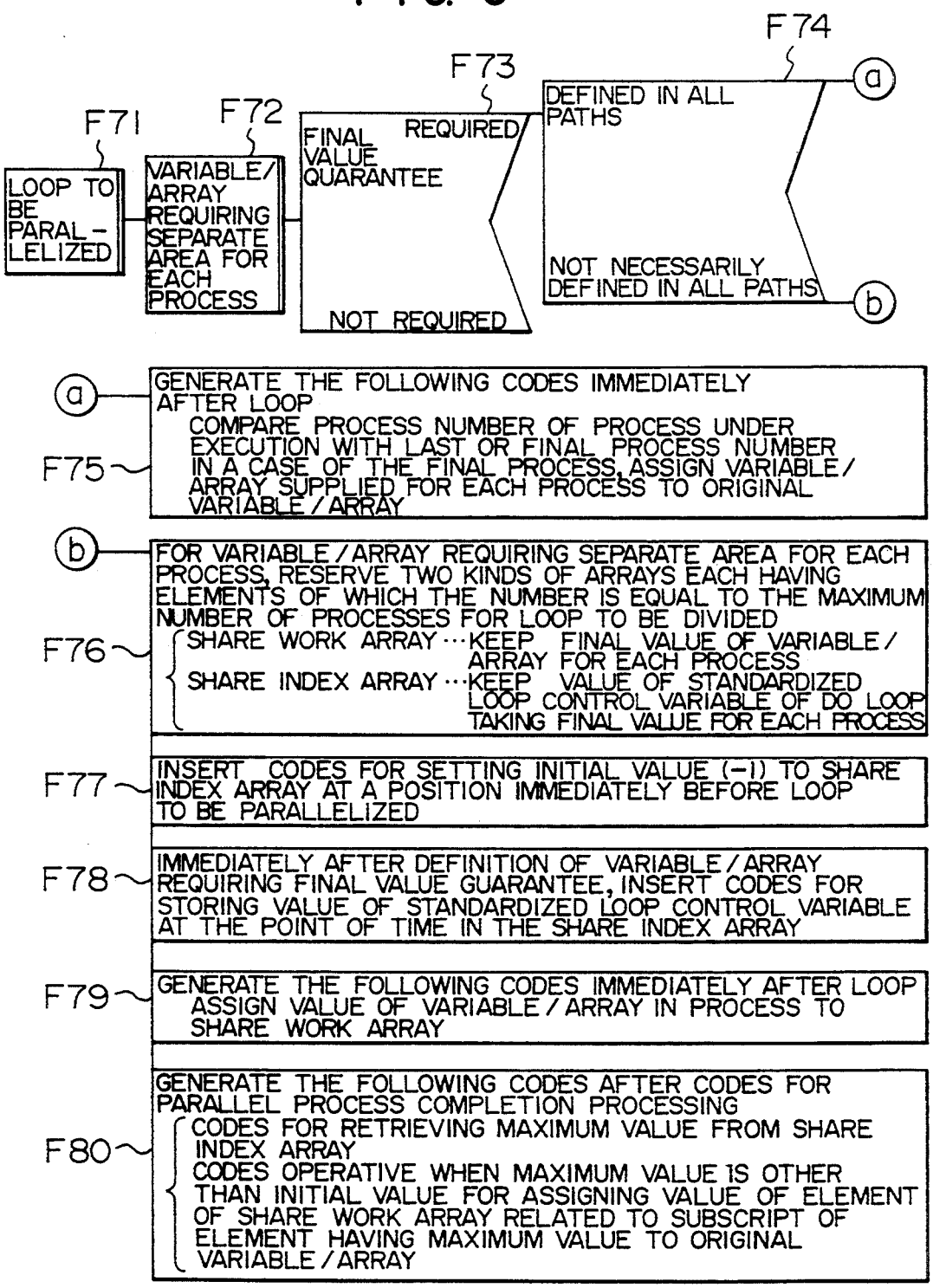
FIG. 6 is a program analysis diagram (PAD) for explaining a processing method of generating codes for guaranteeing a final value for a variable or an array.

Referring next to FIG. 6, description will be given of the processing of the section for generating codes for guaranteeing the final values. The section 10 receives the contents of the final value guarantee table 90 to first select in a step F71 a hoop to be parallelized. In a step F72, a variable/array to be assigned is determined for each process. In a step F73, whether or not the variable/array requires the final value guarantee is examined. When it is determined that the guarantee is required, whether or not the variable/array are necessarily defined in all paths is checked in a step F74. When it is determined to be necessarily defined, a processing step F75 is executed; otherwise, processing steps F76 to F80 are executed.

Next, referring to examples 5 to 7, description will be given in detail of the operation of the generating section 10. Although the examples 5 and 6 are quite similar to the examples 3 and 4, the variable is referenced outside the loop. In this connection, the same reference numerals are assigned to the same codes as those of the examples 3 and 4. Moreover, in the example 6, codes L117 to (L123) are parallel process codes.

EXAMPLE 5

| | |
|---|---|
| DO 10 $I$ = $N1, N2, N3$ | (L110) |
| $T = A(I) + B(I)$ | (L111) |
| $C(I) = T + D(I)$ | (L112) |
| 10 CONTINUE | |
| $X(1) = T$ | (L113) |

EXAMPLE 6

| | |
|---|---|
| CALL ¥DISP ($TBL1$) | (L114) |
| GOTO LAB1 | (L115) |
| LAB2: | |
| DO 10 ¥$L$ = ¥$INI$, ¥$INI$ + ¥$LEN$ − 1 | (L117) |
| ¥$I$ = $N3$*¥$L$ + $N1$ | (L118) |
| ¥$T$ = $A$(¥$I$) + $B$(¥$I$) | (L119) |
| $C$(¥$I$) = ¥$T$ + $D$(¥$I$) | (L120) |
| 10 CONTINUE | |
| IF ( $PID \cdot EQ \cdot TN$) THEN | (L121) |
| $T = T$ | (L122) |
| END IF | |
| codes for returning to caller ( $PRCS$) | (L123) |
| LAB1: | (L124) |
| CALL ¥WAIT | (L125) |
| $X(1) = T$ | (L126) |

EXAMPLE 7

| | |
|---|---|
| DO 20 $I$ = $N1, N2, N3$ | (L130) |
| IF ($A(I) \cdot GT \cdot O$) THEN | (L131) |
| $T = B(I) + C(I)$ | (L132) |
| $A$(1$I$) = $T$ | (L133) |
| END IF | |
| 20 CONTINUE | |
| $X(1) = T$ | (L134) |

Whether or not a variable is necessarily defined on all paths in a loop can be replaced with whether or not the variable definition appears in all iterations of the loop. In a program of the example 5, a variable T is defined in codes L111 of each iteration of a loop starting with codes L110. In the program example 7, since a variable T is not necessarily defined when a condition of conditional codes 1131 is not satisfied, the variable is not necessarily defined in all iterations of the loop. A variable I is an induction variable called a loop control variable. In this regard, since such a definition is absent on the source program, classification of this variable is not made. A known technology is used as a method of determining whether or not a variable is defined in all paths. The determination may be carried out, for example, by data flow equations described in pages 287 and 288 of the "Compiling Algorithms and Techniques for the S-810 Vector processor" written by Michiaki Yasumura, Yoshikazu Tanaka, Yasusi kanada, and Akio Aoyama (International Conference on Parallel Processing 1984, 0190-3918/84/0000/0285S01.00 1984 IEEE). In short, if a variable OUT of a data flow equation for the last block of the DO loop takes a value "1", the variable is necessarily defined in all paths; if the variable OUT takes a value "0", the variable is not necessarily defined in all paths.

In the case of the variable T of the program example 5, it can be recognized from the table 9 of FIG. 9 that the variable T is necessarily defined in all paths. Consequently, in a processing step F75, there are generated object codes as shown in the example 6. Namely, there are generated, at the end of the parallel process codes, codes L121 for comparing a process number ¥PID to be set by the library ¥PRCS for each parallel process with a value of the process number ¥TN of a parallel process including the last iteration of the loop set by the library ¥PRCS and codes L122 for assigning a value of a local variable ¥T disposed for each parallel process to original variable T when the process number ¥PID is the last process number ¥TN. In this case, areas for the process number ¥PID and the process number ¥TN are reserved in the local data area 507-1 or 507-2 by the library ¥PRCS before the parallel process execution and values of the process numbers are set to the parallel process before execution.

The program execution procedure is almost identical to that of the example 4 and hence will be briefly described.

In the codes L114, in order to register parallel process codes L116 to L123 of a DO loop to a parallel process queue 530, the library ¥DISP is called. An argument is passed from the object module to the run time library. The library ¥PRCS for scheduling parallel processes acquires a parallel process from the queue 530 and then causes the process to be executed. The library ¥PRCS supplies the values of ¥INI and ¥LEN to each of the parallel processes generated by optimally dividing the original DO loop into portions by the library ¥DISP, the number of which is within the maximum number of processes for the loop, thereby causing the parallel process codes L117 to 1123 to be executed. In codes L125, there is called the library ¥WAIT to await completion of the plural parallel processes for the DO loop. In the codes L121 and L122, a processing is made for the last value of the loop control variable to guarantee the final value. In the line L122, a computed value of the local variable is assigned to the original variable T. Consequently, even when the scalar variable T is used after all the parallel processes are completed, a correct result is attained.

Next, referring to a program of the example 7, description will be given of the operation in a case where a scalar variable is not necessarily defined in all paths. Processing steps F76 to F80 are achieved by the parallelization compiler to produce an object module as a program example 8 below.

EXAMPLE 8

| | |
|---|---|
| DIMENSION $IND(4), $T(4) | (L140) |
| $IND(1) = −1; $IND(2) = −1 | (L141) |
| $IND(3) = −1; $IND(4) = −1 | |
| CALL ¥DISP (TBL1) | (L142) |
| GOTO LAB1 | (L143) |
| LAB2: DO 20 ¥L = ¥INI, ¥INI + ¥LEN − 1 | (L144) |
| ¥I = N3*¥L + N1 | (L145) |
| IF (A(¥I) · GT · O) THEN | (L146) |
| ¥T = B(¥I) + C(¥I) | (L147) |
| $IND (¥PID) = ¥L | (L148) |
| A(¥I) = ¥T | (L149) |
| END IF | |
| 20 CONTINUE | |
| $T (¥PID) = ¥T | (L150) |
| Codes to return to caller PRCS | (L151) |
| LAB1: | |
| CALL ¥WAIT | (L152) |
| Codes for searching $IND(1), . . . , | (L153) |
| -continued | |
| $IND(4) for first element not having "−1" in reverse direction to set subscript of the first element to k | |
| Codes for setting $T = $T(k) if $IND(K) ≠ −1 | (L154) |
| X(1) = T | (L155) |

Namely, in the processing F76, for each variable/array requiring an area for each process, two areas are reserved for two share arrays. The number of elements of each array is identical to the maximum number of processes stored in the field 104. The first array is a share work array disposed to keep therein the final value of the variable/array for each process. A subscript thereof corresponds to an associated process number. The second array is a share index array employed to keep therein a value of the standardized loop control variable of a DO loop when each element of the share work array corresponding a process takes the final value. In this connection, in codes L140 of the example 8, dimensions of a share index array $IND and a share work array $T are declared. This indicates that the compiler instructs the run time library to generate at most four parallel processes.

In the step F77, codes for initializing the share index array are inserted immediately before the parallel process codes. As a result, codes L141 are generated in the example 8. Each of contents of the share index array indicates whether or not a definition of the associated variable appears in the corresponding parallel process. Namely, if the initial value is kept unchanged, it means that the variable definition is not made in the parallel process.

In the step F78, there are generated, immediately after the definition of the variable/array requiring the final value guarantee, codes for storing the value of the standardized control variable of the DO loop at the time of the definition in an element of the share index array indicated by the process number of a parallel process being currently executed. In the example 8, codes L148 indicate the generated ones.

In the step F79, there are generated, immediately following the loop as an object of the parallelization, codes for assigning the value of a work variable ¥T in the currently executed parallel process to the element of the share work array designated by the process number of the parallel process. In the example 8, codes L150 correspond to the generated ones. Therefore, in the share work array $T of the codes L150, the element thereof corresponding to the parallel process being currently executed contains a value of the variable finally defined in the parallel process.

In the step F80, there is generated codes L152 for awaiting completion of all the parallel processes. In addition, after the codes L152, there are produced codes for searching the share index array for an element having the maximum value of the standardized loop control variable to obtain a subscript of the element, which is equal to an associated process number. In case that the loop is divided into subloops as parallel processes such that control variable values of the loop are continuous in each subloop, the element of the share index array having the maximum value is obtained as a first one not having a value of "−1" when elements of the share index array are examined in a direction in which the subscript value is decreased. Further, there are generated codes for assigning the value of an element of the share work array corresponding to the share index array element having the maximum value to the original variable when the values of all the elements of the share index array are other than the initial value. In the example 8, codes L153 and L154 correspond to the above codes.

In the case where the variable/array is not necessarily defined in all paths, the number of processes to be generated is limited for the following reasons. Namely, the first reason is that the compiler statically reserves areas of the share index and work arrays to develop a highly sufficient performance. The second reason is that when the number of processes is great, the processing of the codes L153 for retrieving the parallel process in which the variable is finally defined becomes to be troublesome with respect to the system performance. Note that in the case of the variable necessarily defined in all paths, the object module may be generated in a method including the processing steps F76 to F80 in place of the processing step F75. In this case, however, the execution efficiency and the main storage utilization efficiency are deteriorated as compared with the case using the processing F75.

According to the compiling method of the present invention, when a scalar variable is necessarily defined in all paths of a DO loop, a process to which the processing associated with the last control variable value of the DO loop belongs, i.e., the last process is recognized by a process number passed from a run time library so that the value of a work variable in the last process corresponding to the original scalar variable is assigned to the original scalar variable. Resultantly, the value of the scalar variable can be correctly used outside the loop.

Moreover, in a case where the scalar variable is not necessarily defined in all paths, the value of the scalar variable last defined with respect to a loop control variable for each process is stored in a share index array which has elements, whose number corresponds to the maximum number of processes specified in the object module, at an element of the share index array whose subscript is associated with the process number of the process. Thereafter, the values are compared with each other such that a process number is obtained for a process in which the scalar variable is last defined in the overall DO loop. Finally, the value of the element of the share work array corresponding to the obtained process number is assigned to the original scalar variable, which resultantly enables the scalar variable to be appropriately used outside the loop.

Also in the case where the scalar variable is necessarily defined in all paths of the loop, a method similar to that used in the case where the scalar variable is not necessarily defined in all paths may be adopted. The operation in this case is also substantially the same as the operation above.

Description has been given of examples taking a simple variable as a scalar variable. The above description is made taking a scalar variable of a simple variable as an example. This can be applied to an array having an invariant subscript in a loop to be parallelized with no change. For example, there is considered the case that a simple variable T is replaced by an element W(3) of an array variable W. When the array has plural elements $A(1), \ldots, A(N)$ and the same elements are defined with respect to a loop (DO 10), as shown in the following example 9, that method can also be applied. More specifically, there may be prepared for each of the array elements $A(1), \ldots, A(N)$ variables according to the present invention, i.e., work variables, $T1, \ldots, TN$ (each of them corresponds to the variable T in the example 6); share index arrays, $\$IND1(4), \ldots, \$INDN(4)$ (each of them corresponds to the array $\$IND(4)$ in the example 8); and share work arrays, $\$T1(4), \ldots, \$TN(4)$ (each of them corresponds to the array $\$T(4)$ in the example 8). If the array A is processed in units of elements, the method of the present invention can be applied. In this case, each of the work variables, the share index arrays and the share work arrays have one more dimension than the array A.

EXAMPLE 9

```
DO 10 I = 1, M
DO 20 J = 1, N
A(J) = B(I, J)*2.0
C(I, J) = A(J)
20 CONTINUE
10 CONTINUE
```

While particular embodiments of the invention have been shown and described, it will be obvious to those skilled in the art that various changes and modifications may be made without departing from the present invention in its broader aspects.

What is claimed is:

1. A method of compiling a source program including a loop into an object program enabling iterations of the loop to be executed in parallel by a plurality of parallel processes in a multiprocessor system, the method including steps to be executed by a computer system, the steps including:

analyzing the source program and translating the source program into intermediate codes, based upon a result of the analyzing;

converting a portion within the intermediate codes corresponding to the loop of the source program into a parallel process portion to be executed by the plurality of parallel processes as respective parts of the iterations to be processed by the loop, wherein a particular variable, if the particular variable exists, which is included in the loop and having a value defined within the loop, is converted at the converting step into a local variable which is valid during the execution of the parallel process portion by one of the plurality of parallel processes and is not shared by the plurality of parallel processes; and generating from the intermediate codes obtained after the converting step, an object program executable by the plurality of parallel processes in the multiprocessor system;

when the particular variable exists in the loop, the converting step further including:

detecting whether a value of the particular variable is defined at any of the iterations of the loop; and adding final value guaranteeing codes to the parallel process portion as part thereof, if a result of the detecting is affirmative, the adding including:

detecting during execution of the parallel process portion by the plurality of parallel processes whether a one process of the plurality of parallel processes executes a last iteration of the loop and adding a first code identifying the one process; and adding a second code representing a final value of the local variable representing the particular variable, obtained by execution of the parallel process portion by the plurality of parallel processes, the second code being set into a value of the particular variable to be used after execution by the plurality of parallel processes, the setting being executed when the one process identified by the first code is detected at execution thereof to be the one process which executes the last iteration in the loop.

2. The compiling method according to claim 1, wherein the first code is located after a portion designating processing defined by the loop, and the second code sets into the value of the particular variable, a value of the local variable which the local variable has at completion of execution of the loop.

3. The compiling method according to claim 1, wherein the converting step further includes the steps of:
   determining, based upon the intermediate codes and before the detecting, whether a value of the particular variable is used in the source program after the loop; and
   starting the detecting step when the determining step is affirmative.

4. A method of compiling a source program including a loop into an object program enabling iterations of the loop to be executed in parallel by a plurality of parallel processes in a multiprocessor system, the method including steps to be executed by a computer system, the steps including:
   analyzing the source program and translating the source program into intermediate codes, based upon a result of the analyzing;
   converting a portion within the intermediate codes corresponding to the loop of the source program into a parallel process portion which represents processing to be executed by each of the plurality of parallel processes as respective parts of the iterations to be processed by the loop, wherein a particular variable, if the particular variable exists in the loop, is included in the loop and has a value defined within the loop, is converted at the converting step into a local variable which is valid during the execution of the parallel process portion by a first parallel process of the plurality of parallel processes and is not shared by the plurality of parallel processes; and
   generating from the intermediate codes obtained after the converting step, an object program executable in parallel in a multiprocessor system;
   when the particular variable exists in the loop, the converting step further including:
   adding final value guaranteeing codes to the intermediate codes, the adding including:
   detecting during the execution of the parallel process portion, a last definition iteration for each of the plurality of parallel processes and adding a first code located within the parallel process portion identifying the last definition iteration for each parallel process, said first code setting each of the last definition iterations into a first array wherein each element of the first array stores the last definition iteration corresponding to one parallel process of the plurality of parallel processes wherein said first array is shared by the plurality of parallel processes, the last definition iteration for the one parallel process being an iteration at which a value of the local variable has been defined last among the iterations to be processed by the plurality of parallel processes within the iterations to be processed by the loop;
   adding a second code located within the parallel process portion, said second code setting during the execution of the parallel process portion by the plurality of parallel processes, a final value of the local variable, obtained by the execution of the parallel process portion by the plurality of parallel processes, into a second array wherein each element of the second array stores the final value of the local variable for each parallel process, the second array being shared by the parallel processes;
   adding a third code located after the parallel process portion, said third code detecting, after completion of execution of the parallel process portion by the parallel processes, a last definition iteration for the parallel process portion which is an iteration last in order among the last definition iterations each having been set in the first array by the first code for each parallel process; and
   adding a fourth code located after the third code, said fourth code setting a one final value from the final values held in the second array into a value of the particular variable, the one final value being used in the source program after the parallel process portion, the one final value having been set into the second array during execution of one of the parallel processes which has processed the last definition iteration detected by the third code.

5. The compiling method according to claim 4, wherein the converting step further includes:
   detecting, before the adding step, whether a value of the particular variable is defined at any of the iterations to be processed by the loop; and
   starting the adding step when a result of the detecting step is negative.

6. The compiling method according to claim 5, wherein the converting step further includes the steps of:
   determining, based upon the intermediate codes and before the detecting step, whether the value of the particular variable is used in the source program after the loop; and
   starting the detecting step in case a result of the determining step is affirmative.

7. The compiling method according to claim 5, wherein the converting step further includes the steps of:
   if the detecting step is affirmative, adding at least one final value guaranteeing code to the parallel process portion;
   adding a fifth code which detects, during the execution of the parallel process portion by each of the parallel processes, whether the each parallel process is one which has executed the last definition iteration of the loop; and
   adding a sixth code which sets a final value of the local variable representing the particular variable, obtained at execution of the parallel process portion by the plurality of parallel process, into a value of the particular variable to be used after execution of the parallel processes, the setting being executed when the fifth code has detected during execution thereof that the each parallel process is one which has executed the last definition iteration of the loop.

8. The compiling method according to claim 5 wherein the detecting step includes detecting, based upon the intermediate codes obtained by the translating step, whether the first code comprises a particular code located at a position enabling the particular code to be executed conditionally at either one of success or failure of the branching, in case the conditional branch code has been detected, the particular code setting, each time the particular code is executed, a sequential number of an iteration at which the particular code has been executed, into one of the elements within the first array corresponding to each parallel process to which the particular code belongs, so that a final value of the element of the first array after execution of the each parallel process represents a last definition iteration for the each parallel process.

9. The compiling method according to claim 5 wherein the detecting step includes detecting, based upon the intermediate codes obtained by the translating step, whether a conditional branch code exists within the loop, and a code which defines a value of the particular variable is executed conditionally at either a success or failure of branching by the conditional branch code;

wherein the first code comprises a particular code located at a position which enables the particular code to be executed conditionally at either the success or failure of the branching, in case the conditional branch code has been detected, the particular code setting, each time the particular code is executed, a sequential number of an iteration at which the particular code has been executed, into one of the elements within the first array corresponding to each parallel process to which the particular code belongs, so that a final value of the element of the first array after execution by the each parallel process represents a last definition iteration for the each parallel process.

* * * * *